April 29, 1958 F. S. LAPEYRE ET AL 2,832,092
MACHINE FOR PEELING SHRIMP
Filed March 30, 1955 5 Sheets-Sheet 3

INVENTORS
FERNAND S. LAPEYRE
JAMES M. LAPEYRE
BY Wilkinson & Maro Kinney
ATTORNEYS

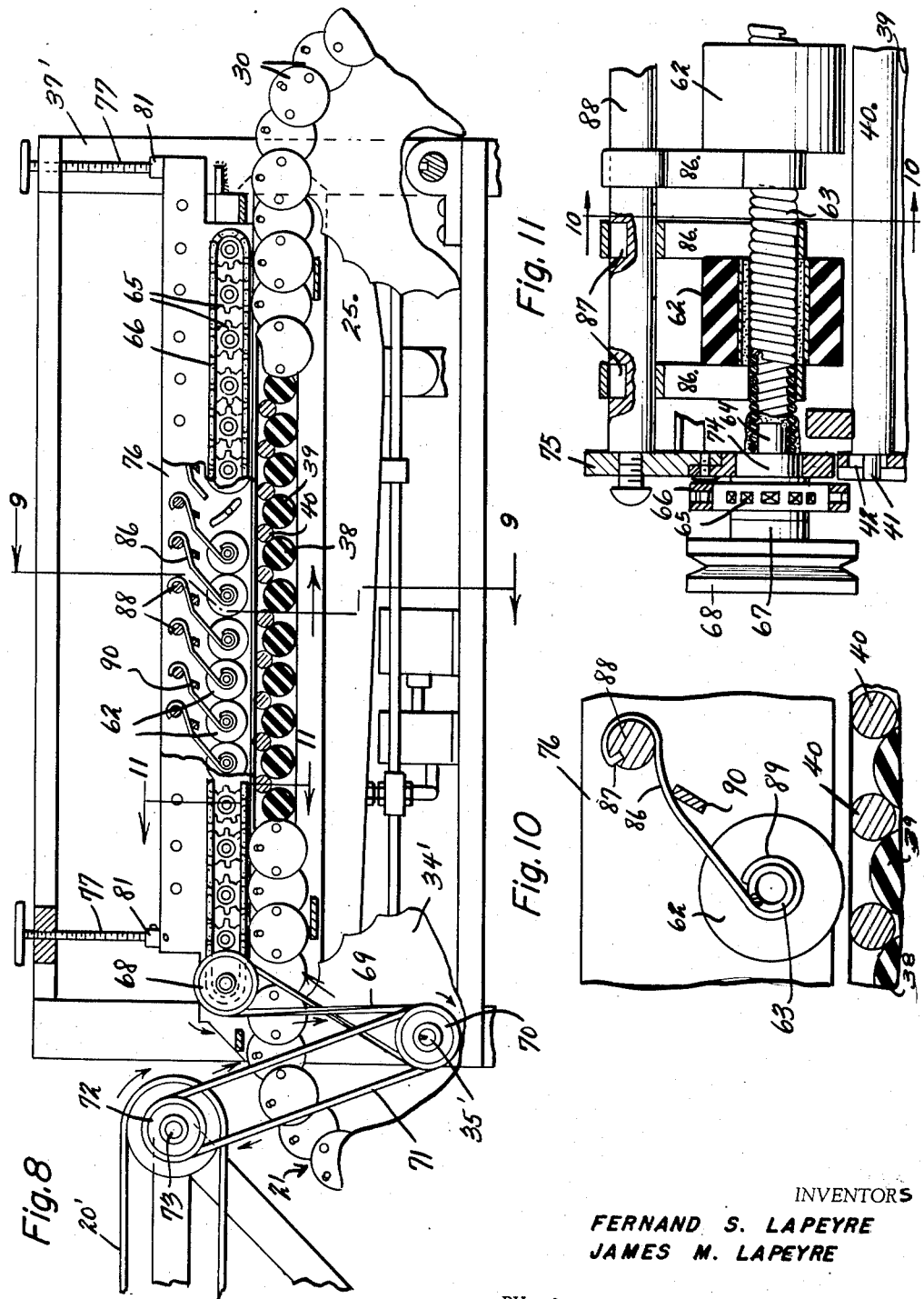

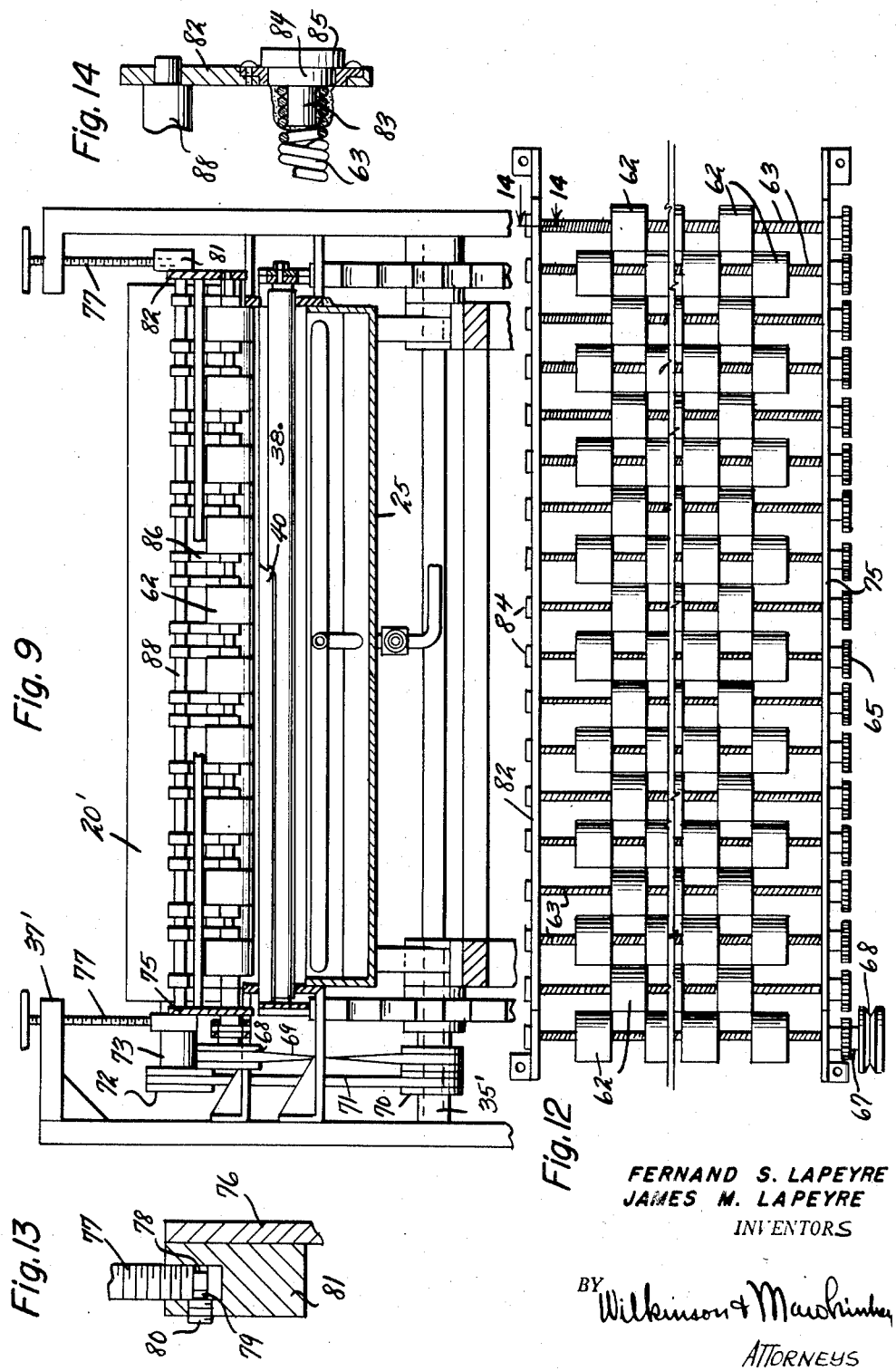

United States Patent Office 2,832,092
Patented Apr. 29, 1958

2,832,092

MACHINE FOR PEELING SHRIMP

Fernand S. Lapeyre and James M. Lapeyre, New Orleans, La., assignors to The Peelers Company, Houma, La., a partnership Application March 30, 1955, Serial No. 497,971

13 Claims. (Cl. 17—2)

The present invention relates to machine for peeling shrimp and has for an object to conserve costs in the shelling of shrimp, not only as regards the initial capital investment in the machine, but also in the maintenance expense thereof and to this end the invention more particularly contemplates a unit of at least two rollers in close association in order to form a bight therebetween for separating the hulls from the shrimp meat incident to the relative rotation of these rollers in opposite directions achieved by a bodily motion of translation of the rollers so that the peeled meat and the separated hulls may be conveyed to separate destinations, all in a continuous operation.

It is another object of the invention to provide an improved machine for peeling shrimp in which the peeling unit involves an association of two rollers providing a peeling nip therebetween which rollers rotate constantly in relatively opposite directions, and besides rotating around their own axes such rollers move with a movement of translation bodily from an origin point where the peeling rollers receive raw shrimp to be peeled and convey the same along a peeling path where the hulls are removed from the shrimp while the peeled meat is carried to a destination remote from the origin point and there released from the rollers.

A further object of the invention resides in providing an improved machine for peeling shrimp in which the unitary arrangement of peeling rollers may be repeated throughout an endless conveyor by which the peeling rollers are carried about in an endless path, with means for continuously rotating the rollers about their own axes in relatively opposite directions to provide a peeling nip therebetween.

A still further object of the invention is to provide an improved machine for peeling shrimp wherein the rollers are movably mounted with respect to one another in a relationship which will automatically require the rollers to move together in the upper run of the conveyor of which they are a part in order to associate the rollers to provide a proper nip for the peeling operation, and which in the lower run of the conveyor will induce the rollers to separate so as to permit the cleansing of the rollers by the action of liquid sprays of the slime and portions of hull that may adhere thereto having been received in the peeling operation previously conducted in the upper run of the conveyor.

It is a still further object of the invention to provide an improved machine for peeling shrimp where the shrimp carried upon a bed of peeling rollers is subjected to the superimposed pressure of pressure communicating means arranged above the bed to the end that the raw shrimp may be pressed downwardly into the peeling bights or nips of the peeling rollers as such shrimp are carried along by the very rollers which also perform the peeling operation so that the rollers in effect perform two functions, namely that of transporting the shrimp, and in the second place in so doing performing a peeling operation upon the shrimp, with means to withdraw the removed hulls during the transporting operation so that when the shrimp peeled meat arrives at destination it will be in a completely separated form such as to afford a presentable commercial product.

It is a still further object of the invention to provide an improved machine for the peeling of shrimp in which improved means is provided for spraying water or other suitable cleansing liquid against the undersides of the peeling rollers in the upper run of the conveyor, and for also directing water against the peeling rollers in the lower run of the conveyor where the rollers have been separated by gravity to permit the free flow of this water between the rollers through spaces which are closed automatically when the rollers move into the upper run of the conveyor.

With the foregoing and other objects in view, the invention will be more fully described hereinafter, and will be more particularly pointed out in the claims appended hereto.

In the drawings, wherein like symbols refer to like or corresponding parts throughout the several views:

Figure 4 is an enlarged fragmentary side elevational view of a section of the peeling and transporting conveyor illustrating the peeling rollers in a nip-closed position as when travelling in the upper run of the conveyor.

Figure 5 is an enlarged vertical sectional view taken on the line 5—5 of Fig. 1. showing the rollers in section with the central roller in the dropped position it occupies for cleansing purposes.

Figure 6 is a transverse sectional view taken on the line 6—6 in Figure 4.

Figure 7 is a similar view taken on the line 7—7 in Figure 4.

Figure 8 is a longitudinal elevational view, with parts shown in section and parts broken away of a modified form of machine.

Figure 9 is a central vertical sectional view taken on the line 9—9 of Figure 8.

Figure 10 is an enlarged fragmentary longitudinal sectional view on the line 10—10 of Figure 11 and showing one of the pressure rollers carried by the adjustable pressure roller frame in relation to the peeling rollers of the peeling and transporting conveyor.

Figure 11 is a vertical transverse sectional view taken on an enlarged scale on the line 11—11 in Figure 8.

Figure 12 is a top plan view showing the arrangement of pressure rollers.

Figure 13 is a fragmentary sectional view taken on an enlarged scale through one of the adjusting screws together with its lock and a portion of the pressure roller frame, and Figure 14 is a vertical sectional view taken on the line 14—14 in Figure 12 on an enlarged scale.

Figure 1:
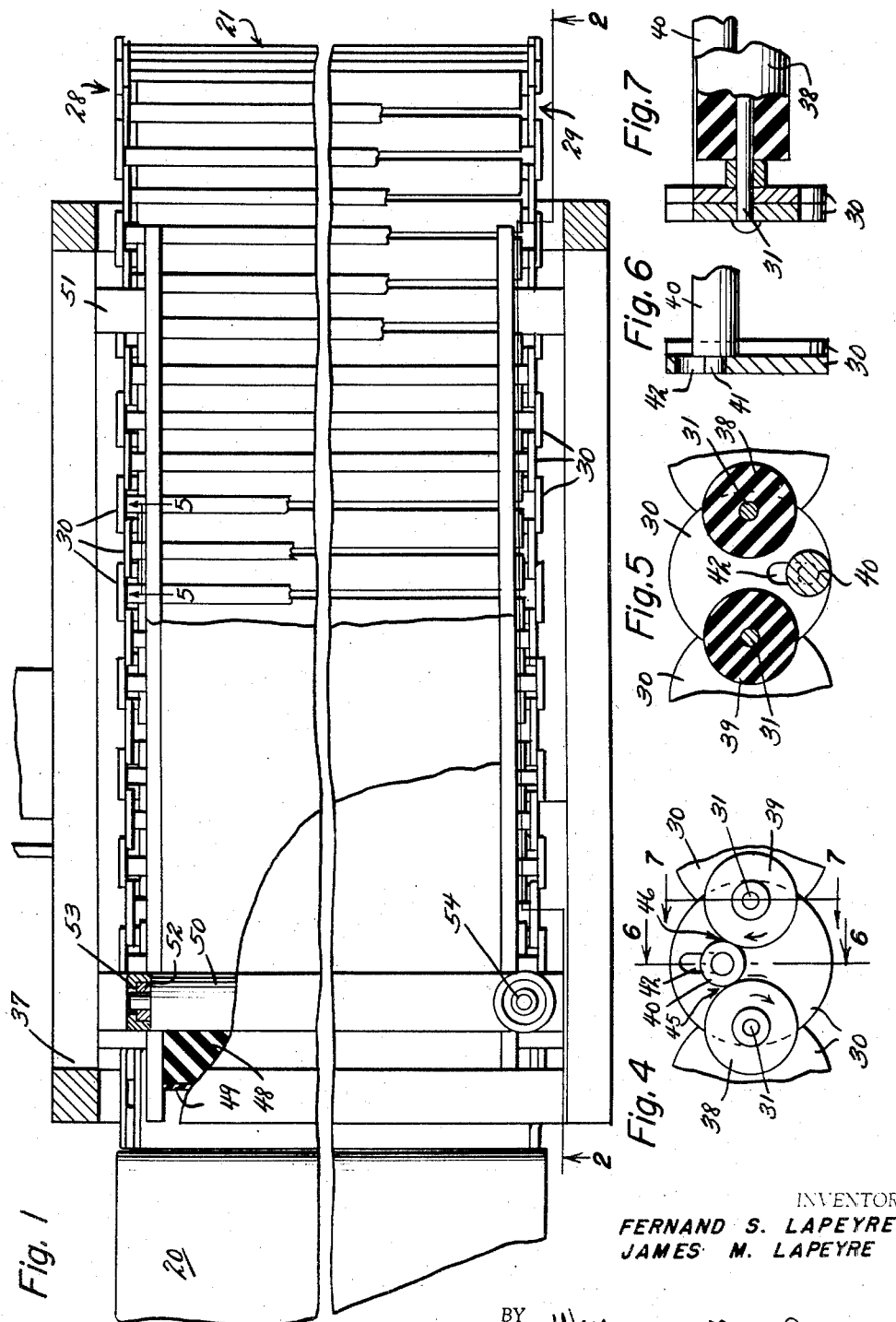
Figure 1 is a top plan view with parts broken away and parts shown in section of an improved machine for peeling shrimp constructed in accordance with the present invention.

Referring more particularly to the drawings, 20 designates a feeding conveyor for transporting the raw shrimp from a suitable source of supply to a peeling and transporting conveyor 21 from which the peeled shrimp meat 22 is delivered to a meat receptacle 23, while the hulls or shells 24 which are drawn through the upper run of the conveyor 21 incident to the peeling operation drop down to a catch pan 25 having a bottom which slopes to a drain pipe 26 down which such hulls or shells are washed to a hull receptacle 27.

The peeling and transporting conveyor 21 may conveniently consist of horizontally spaced side chains 28, 29, shown more particularly in Figure 1, made up of links 30, preferably in the form of thin metallic disks which are partially overlapped and pivoted together by shafts or rods 31 which extend completely across the distance between the side chains 28, 29 and may have their ends which extend beyond the links 30 peened over in order to hold such shafts 31 against any axial movement. These links or disks 30 are adapted to be driven by pairs of sprockets 33 and 34 at opposite ends of the endless peeling and transporting conveyor 21. Such sprockets 33, 34 are provided with arcuate cut-outs 32 struck on the same arcs as the circles of the disks or links 30. The two spaced sprockets 34 are shown more particularly in Figure 3 as being mounted to a shaft 35 which is journalled in appropriate bearings 38 in the frame 37 of the machine. The other pair of sprockets 33 (Figure 2) are mounted upon or affixed to a shaft 36 also journalled in the frame 37. One or other pair of sprockets 33, 34 are driven from an appropriate source of power.

As shown more particularly in Figures 4-7 inclusive inner rollers 38 and 39 of some yieldable material, preferably resilient, for instance rubber are fitted upon the shafts or rods 31 and are adapted to rotate about such shafts or rods 31 or the shafts 31 and the rollers 38 and 39 may rotate as a unit in the links 30.

Outer rollers 40, preferably of some heavy material, for instance steel, alternate with the rollers 38, 39 around the peeling and transporting conveyor 21. Such rollers 40 are carried by trunnions 41 fitted to slide in slots 42 in the disks or links 30. The two rollers 38, 40 constitute a peeling unit which is repeated all around the peeling and transporting conveyor 21. As shown more particularly in Figures 4 and 5 the rollers 38 and 39 are spaced apart and substantially upon the same level, it being understood that the upper and lower runs of the peeling and transporting conveyor 21 preferably travel in parallel or substantially parallel horizontal planes or planes which are approximately horizontal whereby the hard or heavy rollers 40, which will be uppermost of the rollers 38, 39 when in the upper run of the conveyor 21, will drop by gravity as shown in Figure 4 into contact or close relationship with the peripheral surfaces of both companion rollers 38, 39, the slots 42 being vertical in the upper and lower runs of the conveyor 21.

Figure 5 shows the position of the rollers 38, 39 and 40 while travelling in the lower run of the conveyor 21, in which event the hard or heavy rollers 40 are disposed downwardly with respect to the companion rollers 38, 39 and thus under the influence of gravity these rollers 40 will drop down to a lower position out of contact with and spaced from the companion rollers 38, 39.

Figure 2:
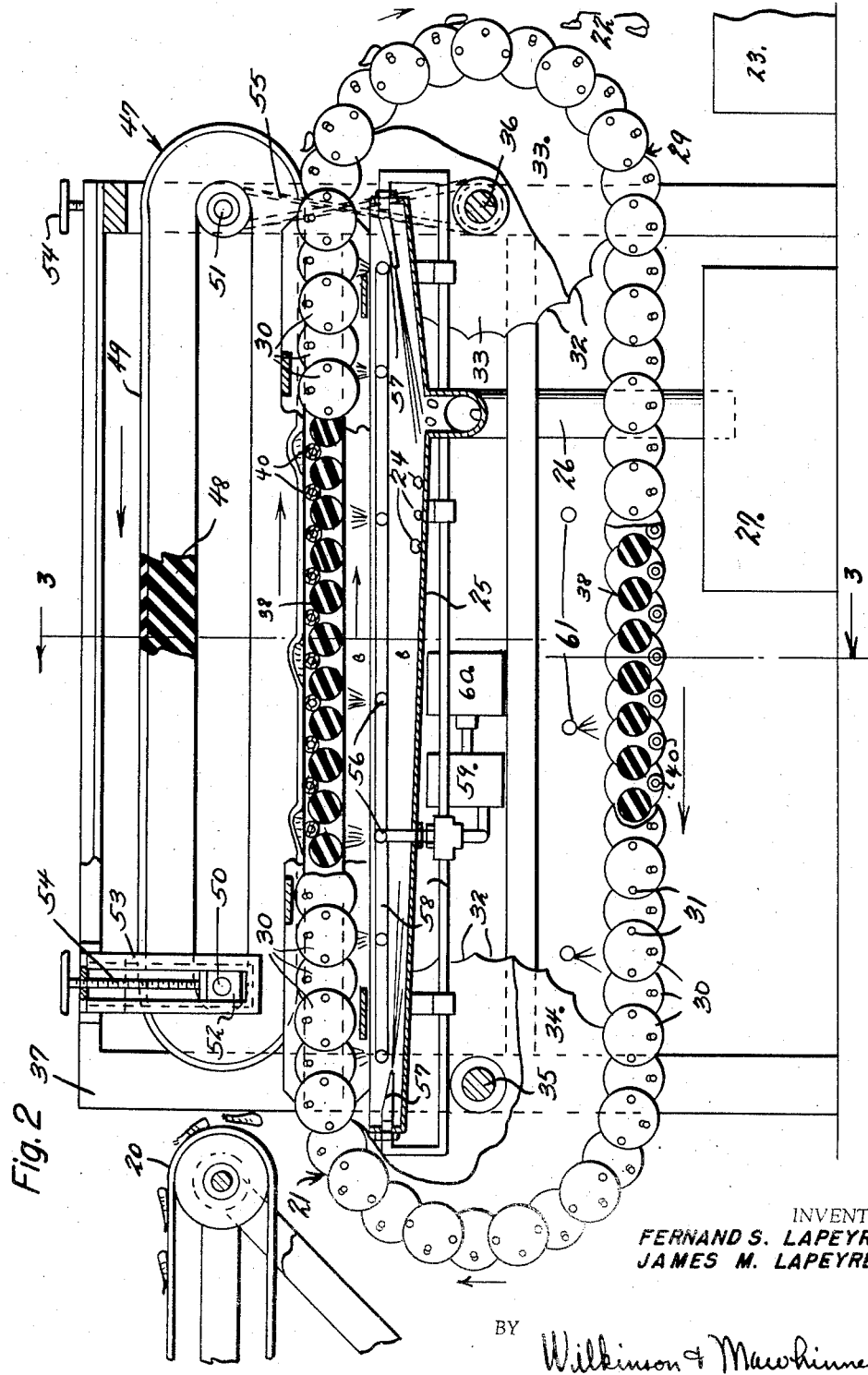
Figure 2 is a longitudinal vertical section of the machine taken on the line 2—2 in Figure 1 and with parts broken away.

It will be understood from Figure 1 that the rollers 38, 39 and 40 extend all the way across between the side chains 28 and 29 of the peeling and transporting conveyor 21 and that these rollers receive directly thereupon the raw shrimp from the feeding conveyor 20, as shown in Figure 2.

Figure 3:
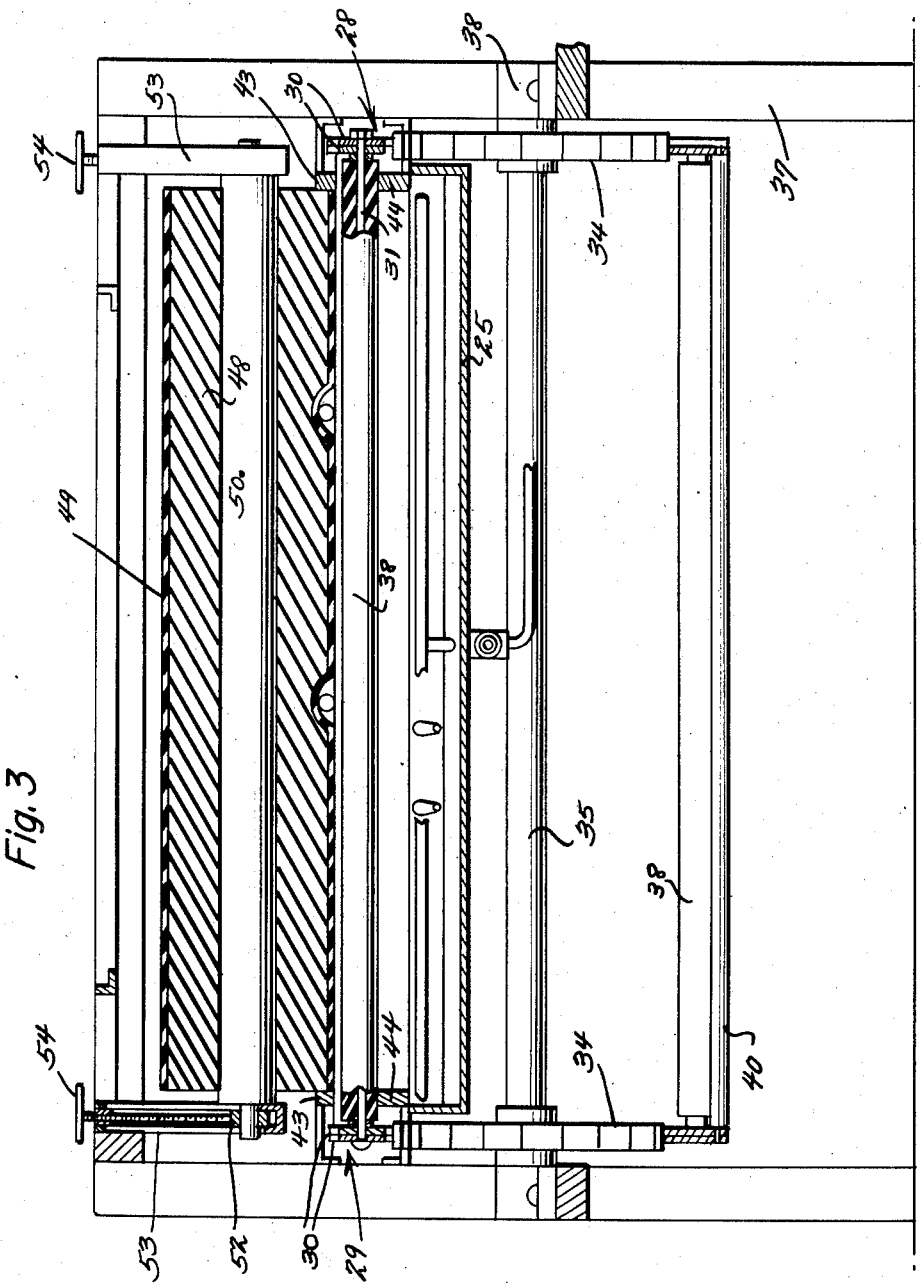
Figure 3 is a vertical central sectional view taken on the line 3—3 in Figure 2.

As these rollers 38, 39 and 40 are elevated about the sprocket 34, as shown by the arrow in Figure 2, into a position beneath the discharge end of the feeding belt 20 and receive raw shrimp they commence to perform a peeling operation upon the shrimp which continues during the transportation of the shrimp across the upper horizontal run of this peeling and transporting conveyor 21. To perform this operation the rollers 38, 39 and 40 are given rotary movement about their own axes. Where these rollers are in peripheral contact in the upper run of the conveyor 21, as explained in connection with Figure 4, the rollers 38, 39 will be required to move in one direction, while the roller 40 rotates in an opposite direction. As a convenient means for achieving the rotation of these rollers upper and lower pairs of guide rails or tracks 43 and 44 are provided, as shown in Figure 3, for engagement by end portions of the rollers. These guides or tracks 43, 44 are carried by appropriate brackets affixed to the frame work 37. The lower guide rails or tracks 44 are positioned to receive thereon and support the lower rollers 38, 39 while the upper guide rails or tracks 43 are positioned to be contacted by the upper portion of the roller 40. As the upper run of the conveyor 21 moves from sprocket 34 toward sprocket 33, namely in the direction of the arrow in Figure 2, the lower rollers 38, 39 will roll along in contact with the lower pair of guide rails or tracks 44 and thus receive a clockwise rotation as viewed in Figure 2 and 4. At the same time the rollers 40 will roll along beneath the upper pair of guide rails or tracks 43 and receive a counterclockwise rotation. Thus the raw shrimp received upon the conveyor 21 from the feeding conveyor 20 are carried along upon a bed of constantly rotating rollers 38, 39 and 40. Each unit of rollers presents two nips 45, 46 to the raw shrimp supported thereon. In one nip 45 the contacting or nearly contacting peripheral surfaces of the rollers 38, 40 will be rotating in a downwardly diagonal direction, while at the opposite nip 46 the contacting or nearly contacting surfaces of the rollers 39 and 40 will be ascending in a substantially diagonal direction.

The raw shrimp are preferably subjected to pressure from above the upper run of the peeling and transporting conveyor 21 and one form of such pressure device consists of an endless pressure belt 47 which may for instance be composed of a soft resilient body 48 and an outer cover 49. The body for instance may be of sponge rubber and the cover of a thin rubber adapted to contain the sponge rubber body. This endless pressure belt 47 is trained about shafts 50 and 51. The reduced trunnions of both shafts may be mounted in bearing blocks 52 which are slidable substantially vertical in guide 53 on the main frame work 37. Adjusting screws are connected to raise or lower the bearing blocks 52, such adjusting screws being indicated at 54. In this way the developed pressure of the belt 47 upon the shrimp lying upon the roller bed 38, 39 and 40 may be varied as desired.

The pressure belt 47 may be driven in synchronism with the peeling and transporting conveyor 21 as by a crossed belt drive 55 between the shafts 36 and 51 as indicated in Figure 2. In this way the upper run of the peeling and transporting conveyor 21 and the lower run of the pressure belt 47 are driven substantially together in the same direction as indicated by the arrows in Figure 2.

Referring more particularly to Figures 2 and 3, water jet nozzles 56 are disposed beneath the upper run of the conveyor 21 with the open mouths of the nozzles directed upwardly so as to play jets of water or other appropriate liquid upwardly against the lower portions of the rotating rollers 38, 39 and 40 into the gaps between these rollers to also wet and lubricate the upper rollers 40 and to wet and lubricate the nips 45, 46 as well as to perform a cleansing function upon these various rollers as the same rotate and therefore present all peripheral areas thereof to the injected water which will also have the further function to tend to wash any hulls clinging to the rollers down into the pan 25 which is disposed directly below the upper run of the conveyor 21.

Also referring to Figure 2, nozzles or water jets 57 are mounted in end portions of the pan 25 in position to direct liquid jets of water down the sloping walls of the pan to wash the hulls 24 to the outlet 26.

The water lines to supply these various nozzles 56 and 57 are designated at 58, the water being forced therethrough from an appropriate source by a pump 59 driven by an electric or other motor 60.

Other water jet nozzles 61 are mounted below the pan 25 and adjacent the lower run of the conveyor 21, the mouths of such jets 61 being disposed downwardly so as to spray water or liquid in sufficient volume and at sufficient pressure upon the various rollers 38, 39 and 40. In the lower run of the conveyor 21 the rollers 40 are in the position illustrated in Figure 5. In other words the rollers 40 have dropped down from a contacting or near-contacting relation with the rollers 38, 39 and provide gaps between these several rollers for easy cleaning.

In the operation of this form of the invention, shrimp delivered to the receiving end of the upper run of the conveyor 21 are subjected to the rolling action of the bed of rollers 38, 39 and 40 as these rollers are pulled through the guide rails or tracks 43, 44. At the same time the shrimp are subjected to the pressure of the belt 47 which presses the raw shrimp down upon the rotating rollers and into the nips thereof. During the progress of the movement the shrimp will be shifted to various positions relatively to the rollers so that all portions of the shrimp will be subjected to the peeling action. The rollers at the nips 45 tend to pinch the shrimp. The external surfaces of the hulls being somewhat rough will be caught particularly in the nips 45 and the shrimp meat will be pinched out of the shells or hulls, the shells or hulls being pulled through the nips and falling or being washed down into the catch pan 25. The liberated meat being smooth and slick affords no surfaces to be grasped by the rotating rollers and consequently such meat as is peeled is rejected at the nips of the rollers and progresses aong the upper run of the conveyor 21 to the discharge end thereof where this meat 22 falls into the meat receptacle 23.

The hulls 24 are caught in the pan 25 while the rollers are cleansed of all hull, gristle and appendages which may be pulled through the nips by the cleansing action of the water sprays 56. Once the hulls and other non-edible matter are washed into the pan 25, the same will come under the influence of the sprays or jets 57 and washed to the drain 26 and to the collection receptacle 27.

Also the nips of the rollers may catch or grasp portions of the shells or hulls of the shrimp and thus perform an unravelling action, pulling the shell from the meat. This action is more fully described in prior Patents Numbers 2,537,355 granted January 9, 1951; and 2,574,044 granted November 6, 1951.

It will be understood that the machine is continuous in operation and requires only the constant supply of the shrimp and a relatively small power input to drive the conveyors 21 and 47 and that necessary to drive the water pump 59. The action is purely automatic and the machine is self-cleaning. For these reasons the machine has a high capacity and will produce a commercial product without damage and of high quality.

It will be noted, more particularly from Figure 4 that the roller 40 is of smaller diameter than the rollers 38, 39. However the diameter of the roller 40 will be greater than the distance between the peripheries of the companion rollers 38, 39 to avoid the roller 40 falling through the space between the rollers 38, 39. Thus it is assured that the roller 40 shall rest with its full weight upon the rollers 38, 39 in a position of Figure 4, such weight being a function of the friction co-efficient between the three rollers which is effective to drive the roller 40 from the rollers 38 and 39 irrespective of the action of the upper guide rails 43. Thus the weight of the upper smaller diameter roller 40 plus the compulsion of the guide rails 43 and 44 determines the pressure at the nips 45, 46, and this pressure may be regulated by these factors to secure the most efficient peeling of shrimp. It will be understood that the lower guide rails 44 will hold the rollers 38, 39 from being pushed downwardly incident to the pressure exerted by the upper guide rails 43 upon the upper portion of the top smaller diameter roller 40, as well as the pressure developed from the pressure belt 49.

The trunnions 41 will preferably not reach the bottoms of the slots 42 in the position of Figure 4 as to do so might negative the weight factor of the rollers 40.

The upper roller 40 is of smaller diameter than the companion rollers 38, 39 for a further reason, that is, to lessen the angle of attack between the rollers 40, 38 and 40, 39. By changing the diameter of the upper roller 40, this angle of attack may be enlarged or diminished to deal effectively with all types and sizes of shrimp.

The pressure belt 47 is composed of the soft resilient body 48 for its soft deformable characteristic which enables it to yield under the pressure of the shrimp thereagainst and to react against the shrimp incident to its inherent elasticity to press the shrimp down upon the bed of rollers. This belt 47 is provided with the outer cover which is both deformable and waterproof in order that it may be non-absorbent to avoid absorbing any substantial quantity of water which would destroy its desired compression characteristics. The thin rubber cover 49 will have a tighter molecular structure than the sponge rubber of the soft resilient body 48 and it thus interposes a barrier between the shrimp and the soft resilient body 48, it being remembered that the shrimp will preferably be contained in a tank of water from which the same will be delivered by the feeding conveyor 20 to the peeling and transporting conveyor 21 and thus the shrimp will be thoroughly wetted and will entrain a large amount of moisture and water. The substance of the rollers 38, 39, may be a medium hard rubber. The substance of the roller 40 will be such as to preferably produce a relatively hard surface as compared with the rollers 38 and 39 and to possess a substantial weight mass for the purposes already stated.

Referring more particularly to Figures 8 to 14 inclusive, the pressure belt 47 is dispensed with and a modified form of pressure device consists of multiple pressure rollers 62, preferably of medium soft rubber, which are mounted to rotate about coil spring shafts 63. The shafts 63 are substantially parallel to one another in a substantially horizontal plane above the upper run of the peeling and transporting conveyor 21 so that, while the peripheries of these rollers 62 do not necessarily come into direct contact with the rollers 38, 39 and 40 of the peeling and transporting conveyor 21, they may exert a downward pressure upon the shrimp as it is carried along by the conveyor 21 and supported above the roller bed.

As best seen in Figure 12, the rollers 62 may be staggered laterally on alternate shafts 63. The coil spring shafts 63, although anchored at opposite ends, are capable of flexing up and down out of the axial lines of the shafts 63 incident to the downward bodily movement of the rollers 62 in response to yieldable pressure exerted thereupon.

As shown more particularly in Figure 11, the coil spring shafts 63, at one end thereof, are anchored or affixed to drive studs 64 driven by sprockets 65. All of these sprockets 65, at one side of the machine, are engaged by an endless chain 66. One of the drive studs 64, that at the lefthand end of Figure 8, is extended outwardly into a shaft 67 upon which is fixed a pulley 68. The pulley 68 is engaged by a crossed belt 69 engaged with and driven by a pulley on the shaft 35' of the sprocket 34' of the feeding and transporting conveyor 21. Upon this shaft 35' is also affixed a pulley 70 driven by a belt 71 from a pulley 72 affixed to the shaft 73 of the feeding conveyor 20'.

Referring to Figure 11, the drive studs 64 have bearings 74 appropriately journalled in one side plate 75 of a roller frame 76 suspended from the main frame of the machine by adjusting screws 77 so as to be raised and lowered in order to elevate or drop the rollers 62 relatively to the roller bed of the conveyor 21.

In Figures 8 and 9 the adjusting screws 77 are shown as threaded through overhanging portions of the frame 37'.

In Figure 13 the lower ends of the adjusting screws 77 are shown as provided with annular grooves 78 spaced above their terminal ends into which locking projections 79 are received, such projections being upon screw plugs 80 which are removably fitted to blocks 81 affixed to the roller frame 76. Four such adjusting screws 77 may be provided, one at each of the four corners of the roller frame 76.

Referring more particularly to Figure 14, the opposite ends of the coil spring shafts 63 have their terminal convolutions fitted over idler studs 83 having bearings 84 in the other side plate 82 of the roller frame 76. The bearings have enlarged heads 85 on the outside of the plate 82 to prevent the bearings 84 and the studs 83 from being pulled through the plate 82 incident to the weight of the coil spring shafts 63 and the weight of the rollers 62 thereon.

Referring more particularly to Figures 10 and 11, each roller 62 is subjected to the downward pressure of resilient arms 86, of which two are preferably provided for each roller 62.

The arms may be of flat spring steel or other appropriate material possessing inherent elasticity. Such arms 86 are anchored at their upper ends 87 in a fixed rod or bar 88 carried above the shafts 63 in the roller frame 76. Preferably one rod or bar 88 will be provided for each coil spring shaft 63. The lower ends of the arms 86 may be simply wrapped around, or given one turn around the corresponding coil spring shaft 63. Stops 90 are carried by the frame 76 beneath the resilient arms 86 in a position to restrict the downward motion of these resilient arms 86 to which they are biased by the set given to the arms in installing the same. In other words the resilient arms 86 will by virtue of their inherent resiliency seek a position against the stops 90 and in so doing will subject the rollers 62 to the elastic pressure of the arms. Such pressure will be communicated through the rollers 62 to the shrimp upon the roller bed of the conveyor 21. The rollers will be permitted to individually rise to permit the passage of large shrimp or a coincidence of two or more shrimp.

In the operation of this form of the invention, raw shrimp will be delivered by the feeding belt 20' to the peeling and transporting conveyor 21 which may be identical with that already described. As this conveyor 21, through its upper run, moves with its burden of shrimp, those shrimp will contact the pressure rollers 62 by which the shrimp will be forced down upon the bed of rollers of the conveyor 21 and subjected to a peeling operation as heretofore described. Where no positive drive is provided for the rollers 62, such rollers will be rotated incident to contact with the shrimp moving along with the conveyor 21. However, where it is desirable to positively drive the rollers 62, the same will be affixed to coil spring shafts 63 and such shafts will be driven through the sprockets 65, chain 66 arrangement from the system of belts shown in Figure 8 and already described or to other sources of power. As the rollers 62 move up and down incident to encountering of bulk shrimp on the conveyor 21 and also to the reactionary resilient action of the arms 86, the shafts 63 will bend out of axial line, the convolutions of the helices opening or distending to permit such movement freely. Also incident to the inherent elasticity in the coil spring shafts 63 such shafts and the entrained rollers 62 will be restored to normal position after each displacing or offsetting motion.

In addition to the pressure exerted upon the shrimp by the rollers 62 individually through their spring arms 86, an overall rough adjustment of pressure may be made by the adjusting screws 77 in raising or lowering the roller frame 76 as an entirety.

As shown in Figure 12, it will be seen that a large bank of the rollers 62 are presented to the shrimp so as to cover the upper run of the peeling and transporting conveyor 21 from side to side thereof and substantially throughout the length of the upper run of this conveyor 21. Consequently pressure will be exerted through all parts of the roller bed 38, 39 and 40. It will be understood that the rollers 62 act individually, that is while some of the rollers 62 are in a raised position others will be in the lowermost position permitted by the stops 90. Thus the required pressure is applied locally throughout the entire length and breadth of the upper run of the conveyor 21 and the pressure will be automatically applied wherever needed. In the same way the rollers 62 will individually yield upwardly in circumstances where normal bulk is encountered which might otherwise result in breakage to parts of the machine requiring suspension of operation while repairs were being made.

Although we have disclosed herein the best form of the invention known to us at this time, we reserve the right to all such modifications and changes as may come within the scope of the following claims.

What is claimed is:

1. A machine for peeling shrimp comprising rotatable and bodily movable rollers associated in nip relationship for the peeling of raw shrimp, means operatively associated with the rollers for moving the rollers through a motion of translation to transport the shrimp from an origin to a destination point, means operatively associated with the rollers for imparting rotary movement to the rollers during the movement of translation, such motion being a continuous rotary movement in relatively opposite directions of the nip forming rollers whereby to perform a peeling operation upon the shrimp, and means above the rollers for reacting against the shrimp carried by the rollers to force the shrimp down into the nip.

2. In a machine for peeling shrimp, a pair of rollers associated together to provide a nip therebetween for the peeling of shrimp, means positioned with respect to the rollers for delivering raw shrimp to the nip in one position of the rollers, means operatively associated with the rollers for moving the rollers through a motion of translation to a point of discharge of the shrimp meat from the rollers, means operatively associated with the rollers for communicating a continuous rotary movement to the rollers in opposite directions to perform a peeling operation on the shrimp during the motion of translation, and means positioned with respect to the rollers for imposing a yielding pressure upon the shrimp on the rollers to urge the shrimp into the nip therebetween.

3. In a machine for peeling shrimp, an endless conveyor, rotary rollers forming a portion of said conveyor and forming peeling nips therebetween, means operatively associated with the conveyor for driving the conveyor to communicate to the rollers a motion of translation, means operatively associated with the rollers for driving alternating rollers in opposite directions during the motions of translation to cause peeling of the shrimp, and means positioned relative to the rollers and conveyor for communicating a yielding pressure to the raw shrimp on top of the conveyor to urge the same into the nips between the rollers.

4. In a machine for peeling shrimp, an endless conveyor, spaced soft-bodied rollers mounted for rotation as a part of said conveyor, hard-surfaced rollers mounted between the first mentioned rollers and being of a diameter greater than the space between the soft-bodied rollers, said hard-surfaced rollers mounted to slide in and out of peripheral contact with the soft-bodied rollers whereby in the upper run of the conveyor the hard-surfaced rollers will drop by gravity into friction peripheral drive contact with the soft-bodied rollers and in the lower run of the conveyor such hard-surfaced rollers will drop by gravity away from the soft-bodied rollers, means positioned relative to the origin end of the conveyor for delivering shrimp upon the rollers at approximately the origin end of the upper run of the conveyor, means operatively associated with the rollers for causing the rollers to rotate with the soft-bodied rollers rotating in one direction and the hard-surfaced rollers rotating in the opposite direction whereby to perform a peeling operation upon the shrimp and to draw the hulls downwardly into the interior space of the conveyor, means operatively associated with the upper run of the conveyor for directing a cleansing liquid upon the inner portions of the rollers in the upper run of the conveyor, and means operatively associated with the lower run of the conveyor for directing cleansing liquid from inside the conveyor downwardly upon the rollers in the lower run of the conveyor.

5. In a machine for peeling shrimp, an endless conveyor, inner and outer rollers carried with said conveyor and being rotatably mounted therein to move bodily with the conveyor and at the same time rotate about their own axes, means in the conveyor for slidably supporting the outer rollers in the relationship that when in the upper run of the conveyor where the outer rollers are uppermost, the same will drop by gravity into nip-forming relation to the inner rollers and in the lower run of the conveyor where the outer rollers are lowermost such outer rollers may drop by gravity to create wide gaps between the rollers, for freeing adherent matter and matter caught in the nips of the rollers, means operatively associated with the conveyor for moving the conveyor, and means operatively associated with the rollers for rotating the inner rollers in one direction and the outer rollers in the opposite directions incident to their motion of translation with the conveyor.

6. In a machine for peeling shrimp, a conveyor comprising slotted links pivoted together, inner and outer rollers rotatably mounted in the links, said outer rollers having end trunnions journalled for rotation and sliding movement in the slots of the links whereby in the upper run of the conveyor such outer rollers will fall by gravity automatically into nip-forming relationship with the inner rollers and in the lower run of the belt where the outer rollers are lowermost such outer rollers may descend by gravity to provide wide gaps between the rollers, means operatively associated with the gaps for introducing cleansing liquid through such gaps, means operatively associated with the conveyor for driving the conveyor to cause bodily motion of the rollers, and means operatively associated with the rollers for causing the inner rollers to rotate in one direction and the outer rollers to rotate in the opposite direction incident to the movement of the conveyor.

7. In a machine for peeling shrimp, a conveyor comprising side chains of disk links pivoted together and having slots therein, inner rollers rotatably mounted in the disks substantially coincident with the pivot points thereof and being spaced apart along the conveyor, outer weighted rollers having trunnions rotatable and slidable in the slots of the links and being mounted outwardly of the spaces between the inner rollers whereby in the upper run of the belt to fall by gravity into nip-forming relationship with the inner rollers and in the lower run of the belt to fall by gravity to provide wide gaps between the inner and outer rollers, scalloped sprockets for receiving said disks, means operatively associated with the conveyor to drive the conveyor, and means operatively associated with the conveyor to rotate the inner rollers in one direction and the outer rollers in the opposite direction incident to the movement of the rollers with the conveyor.

8. In a machine for peeling shrimp, bodily movable and rotatable rollers disposed in nip-forming relationship to peel shrimp, means operatively associated with the rollers for moving said rollers through a motion of translation and at the same time rotating the rollers forming each nip in relatively opposite directions about their own axes, and means operatively associated with the rollers for subjecting the shrimp on the rollers to pressure to urge the shrimp downwardly into the nips, said means constituted of an endless pressure conveyor comprising an inner body of soft resilient material, and an outer moistureproof resilient thin covering therefor.

9. In a machine for peeling shrimp, bodily moving rotating rollers in nip-forming relationship for receiving shrimp thereon to conduct the peeling operation thereon, and means operatively associated with the rollers for subjecting the shrimp on the rollers to downward pressure for urging the shrimp into the nips of the rollers, said means comprising a pressure belt comprising an inner body of sponge rubber and an outer thin rubber cover for encountering the shrimp, and means operatively associated with the pressure belt for rotating the pressure belt substantially synchronously with the bodily movement of the rollers.

10. In a machine for peeling shrimp, bodily movable rollers in nip-forming relationship to peel raw shrimp delivered thereon, means operatively associated with the rollers for bodily moving the rollers and also for rotating the rollers forming each nip about their own axes in relatively opposite directions, a plurality of pressure rollers positioned above the peeling rollers, means operatively associated with the pressure rollers for yieldably urging the pressure rollers downwardly upon the shrimp carried upon the peeling rollers, and stop means operatively associated with the last mentioned means for restricting the effort of the last mentioned means to prevent the pressure rollers from coming in contact with the peeling rollers.

11. In a shrimp peeling machine, bodily moving and continuously rotating rollers in nip formation for peeling shrimp placed thereon, pressure rollers mounted above the peeling rollers, means operatively associated with the pressure rollers for yieldably urging the pressure rollers downwardly upon shrimp occupying the peeling rollers, and a resilient shaft for the pressure rollers adapted to flex out of axial alignment incident to rising and falling movement of the pressure rollers.

12. In a shrimp peeling machine, peeling rollers in nip formation for peeling shrimp, means operatively associated with the rollers for bodily moving the peeling rollers and at the same time rotating the rollers forming each nip in relatively opposite directions to perform a peeling operation upon shrimp placed thereon, a bank of pressure rollers mounted above the peeling rollers, resilient shafts to which said peeling rollers are affixed, means operatively associated with said shafts for driving said shafts and the pressure rollers mounted thereon, and means operatively associated with the pressure rollers for yieldably urging the pressure rollers downwardly and the resilient shaft out of its axial line.

13. In a machine for peeling shrimp, peeling rollers in nip-forming relationship adapted to peel shrimp placed thereon, means operatively associated with the rollers for bodily moving said peeling rollers and at the rollers forming each nip time rotating the same in relatively opposite directions, pressure rollers above the peeling rollers, resilient shafts for rotatably supporting the peeling rollers, resilient arms connected to said resilient shafts and biased to a sprung condition in which the pressure rollers and spring shafts are urged downwardly toward the peeling rollers, and stops for limiting this downward movement.

References Cited in the file of this patent

UNITED STATES PATENTS

| | | |
|---|---|---|
| 1,703,123 | Triplett | Feb. 26, 1929 |
| 2,180,567 | Urschel | Nov. 21, 1939 |
| 2,537,355 | Lapeyre et al. | Jan. 9, 1951 |
| 2,719,555 | Wood | Oct. 4, 1955 |